United States Patent
Hösle

(10) Patent No.: US 6,790,156 B2
(45) Date of Patent: *Sep. 14, 2004

(54) TRANSMISSION FOR WIND GENERATORS

(75) Inventor: Helmut Hösle, Diedorf (DE)

(73) Assignee: Renk AG, Augsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/944,337

(22) Filed: Aug. 31, 2001

(65) Prior Publication Data

US 2002/0049108 A1 Apr. 25, 2002

(30) Foreign Application Priority Data

Sep. 1, 2000 (DE) .......................... 100 43 593

(51) Int. Cl.[7] ............................................. F16H 47/04
(52) U.S. Cl. ........................ 475/331; 475/346; 290/44; 290/55; 310/83
(58) Field of Search .................... 290/44, 55; 475/331, 475/346, 334, 249; 310/83; 74/414, 421 R

(56) References Cited

U.S. PATENT DOCUMENTS

| | | | | |
|---|---|---|---|---|
| 1,432,090 A | * | 10/1922 | Simpson ..................... | 475/341 |
| 3,854,349 A | * | 12/1974 | Michling .................... | 475/337 |
| 4,383,520 A | * | 5/1983 | Huebl et al. ................ | 261/151 |
| 4,619,158 A | * | 10/1986 | Nelson ....................... | 475/330 |
| 5,529,566 A | * | 6/1996 | Weil ............................. | 494/1 |
| 6,082,901 A | * | 7/2000 | Arvidsson ................... | 384/121 |
| 6,170,156 B1 | * | 1/2001 | Lev et al. .................... | 29/404 |
| 6,176,804 B1 | * | 1/2001 | Kekki et al. ................ | 290/55 |
| 6,420,808 B1 | * | 7/2002 | Hosle ......................... | 475/346 |
| 6,459,165 B1 | * | 10/2002 | Schoo ......................... | 290/44 |

FOREIGN PATENT DOCUMENTS

| | | | | |
|---|---|---|---|---|
| DE | 37 14 859 | | 11/1988 | |
| DE | 4224228 A1 | * | 2/1993 | ............ F03D/9/00 |
| DE | 198 57 914 | | 7/2000 | |
| DE | 199 17 605 | | 1/2001 | |
| JP | 07054763 A | * | 2/1995 | .......... F03D/11/02 |
| JP | 07229471 A | * | 8/1995 | .......... F03D/11/02 |
| WO | 96/11338 | | 4/1996 | |

* cited by examiner

Primary Examiner—Charles A. Marmor
Assistant Examiner—Dennis Abdelnour
(74) Attorney, Agent, or Firm—Cohen, Pontani, Lieberman & Pavane

(57) ABSTRACT

A wind-driven rotor is connected to a generator via a multi-stage planetary transmission arrangement and a spur gear stage. The rotor is supported in the housing of the transmission, and an annular gear carrier with an annular gear is arranged directly on the rotor. The transmission represents a compact drive with a high transmission ratio for driving generators by wind power and makes assembly simple.

20 Claims, 2 Drawing Sheets

TRANSMISSION FOR WIND GENERATORS

BACKGROUND OF THE INVENTION

1. Field of the Invention

The invention relates to a transmission for wind generators of the type having a rotor connected to at least one generator via a multi-stage transmission and a spur gear.

2. Description of the Related Art

DE 199 17 605, to which U.S. Pat. No. 6,420,808 corresponds, shows a shaft-mounted transmission for wind generators. This transmission is mounted on a rotor shaft supported in the tower of a wind power plant and is supported on the shaft via two bearings. The transmission housing is attached to the tower of the plant by means of torque arms.

The rotor shaft is driven at the end remote from the transmission by a rotor head with wind blades and passes the driving torque into the transmission via an annular gear. The annular gear is secured on the rotor shaft by means of an annular gear carrier and drives the planetary gears of a first planetary stage. The shafts, which are mounted in a manner fixed relative to the housing, each carry a further planetary gear of a second planetary gear stage, which drives the shaft of a spur gear via a sun gear. A pinion that meshes with this spur gear drives the generator via another shaft. Such plants are assembled from a large number of components in an involved process and result in a large overall length.

SUMMARY OF THE INVENTION

Taking this as a starting point, the object of the invention is to create a more compact plant that is of shorter and lighter construction and can be assembled more easily.

According to the invention, the rotor is supported in the transmission housing and has an annular gear carrier with an annular gear fixed thereto, the annular gear forming part of the transmission.

Through the elimination, in accordance with the invention, of the rotor shaft together with its bearing arrangement in the tower, a particularly advantageous shorter construction of the plant is obtained.

This furthermore offers the advantageous opportunity to shorten the machine housing, and the reduced number of components means that the weight of the top of tower is lower, thus allowing the supporting structure to be of smaller dimensions.

By virtue of the construction according to the invention and the elimination of a joint between the transmission and the rotor shaft, assembly is considerably simplified, thereby advantageously shortening the time for assembly.

Thanks to uncomplicated extension of the rotor, the transmission housing and the annular gear carrier, the span of the rotor bearing arrangement can be extended and thus advantageously adapted in a simple and optimum manner to the external force conditions.

The sliding-contact bearings provided according to the invention can advantageously be raised hydrostatically when starting the rotor and transferred to hydrodynamic operation through a simple control operation as the speed increases.

A crowned toothed coupling between the annular gear carrier and the annular gear itself allows the toothing of the annular gear to center itself on the planetary gears.

By virtue of the advantageous integration of the rotor with its bearing arrangement into the transmission, the transmission housing also supports the rotor head with the blades, thereby making it possible to dispense with additional supporting or bearing structures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
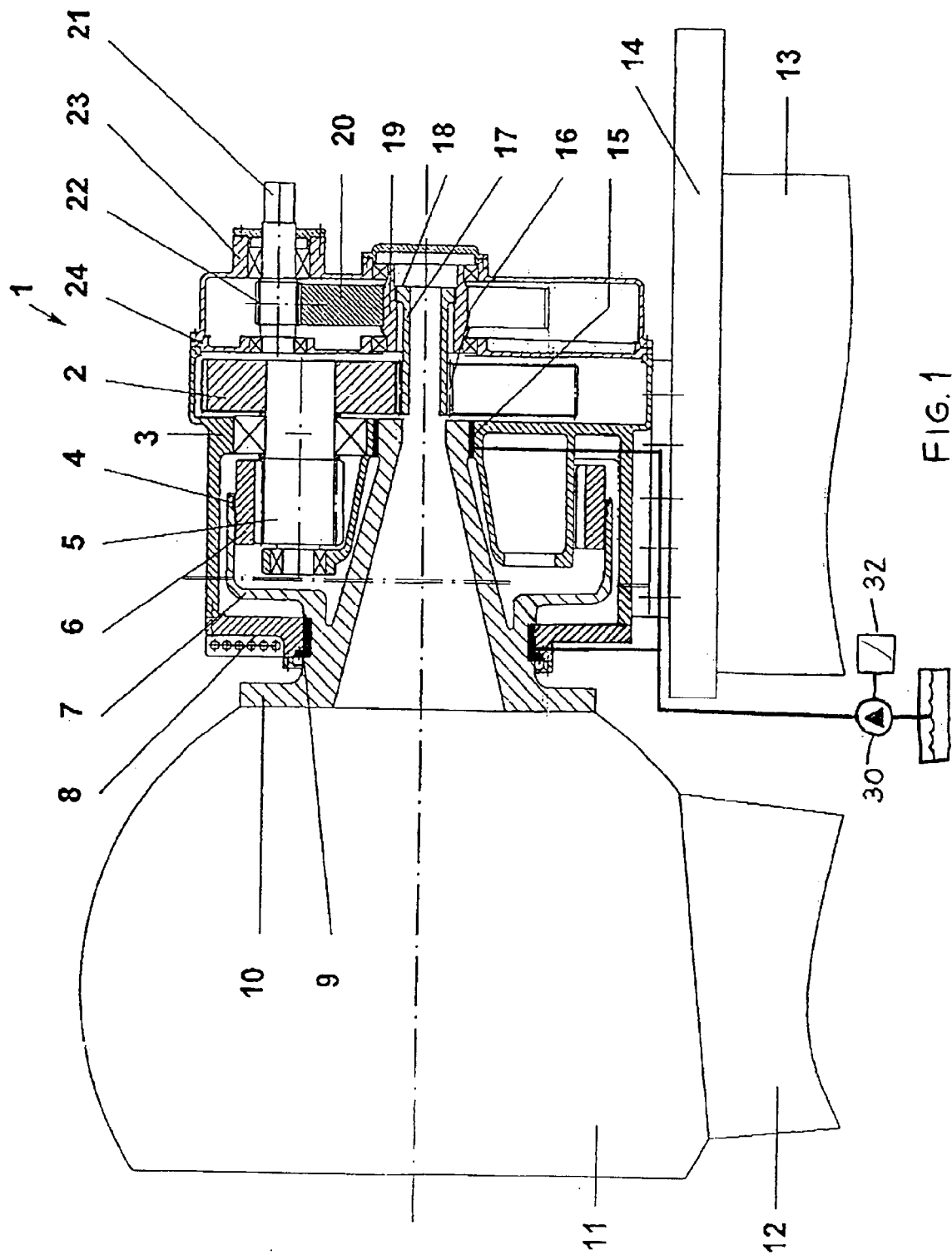
FIG. 1 is a section view of a transmission according to an exemplary embodiment.

The single FIGURE shows a cut-away view of the top end of the tower (13) of a wind power plant with a rotatable platform (14). The housing (3) of the transmission (1) and a generator (not shown) are secured on the platform (14). However, it is also possible to flange the generator directly to the transmission (1).

The rotary motion produced by the wind is transmitted by the rotor head (11), which carries the blades (12), to a rotor (10). The rotor head (11) is preferably bolted to the rotor (10), but it is also possible to produce the two parts in one piece. The rotor (10) is supported by the housing (3, 8) and mounted rotatably in the housing (3, 8) and provided with an annular gear carrier (7).

The annular gear carrier (7) accommodates the annular gear (6), which transmits the power to one or more planetary gears (5). Each planetary gear (5) is fixed on a respective shaft which is supported by the housing (3) and rotatably mounted at a fixed position in the housing (3). Arranged in an axially offset position on the latter's shafts rotatably mounted in the housing (3) there is in each case a further planetary gear (2), which meshes with a sun gear (16). From the sun gear (16), which is cantilever-mounted in a centered manner between the planetary gears (2), the power is passed via a hollow-bored sun gear shaft (17) to a hub (19), which is preferably internally toothed and is in form-locking engagement with external toothing on the sun gear shaft (17) in such a way as to allow angular movement. The hub (19) carries a spur gear (20), which meshes with a pinion (22) that is preferably cut directly into the output shaft (21). From the output shaft (21), the driving power is passed directly or indirectly into the generator.

Thanks to the cylindrical flanged housing (23), which is arranged concentrically around the spur gear (20), a plurality of output shafts (21) can be provided around the circumference of the spur gear (20) in a particularly advantageous manner. The output shafts (21) are preferably provided with pinions (22), as described above, and each drives a generator. For example, two output shafts (21) can be arranged on the flanged housing (23), one above and one below the spur gear (20), on the vertical axis of symmetry, and/or two output shafts (21) can be arranged to the left and to the right on the flanged housing (23), on the horizontal axis of symmetry of the spur gear (20). This advantageous arrangement is a simple and economical way of enabling several generators to be driven by means of one transmission (1).

To accommodate control devices for influencing the positions of the blades, the rotor (10) is hollow. Adjoining the rotor (10) is a tube that passes through the flanged housing (23) to the opposite side of the transmission (1) from the rotor head (11) and allows actuating devices for the control devices to be fitted. An essential feature of the present invention is the integration of the rotor (10) into the transmission (1), the transmission (1) thus additionally assuming the function of supporting the weight and the operating forces of the rotor head (11) with the blades (12). In this arrangement, the rotor (10) transmits the driving power directly to the transmission (1) via the annular gear carrier (7, 7'), assuming the function of a drive shaft, and the principle of direct power transmission is thus achieved. By virtue of these innovations of essential significance to the invention, both a rotor shaft and at least one joint for transmitting the driving power, the latter being complicated to assemble, are eliminated.

The rotor (10) is preferably guided by two sliding-contact bearings (9, 15), one bearing (15) being situated at one end of the rotor, within the transmission, and being secured on the main body of the housing (3). The other bearing (9) supports the rotor (10) at the end adjacent to the rotor head (11) and is secured on a transmission cover (8, 8'). At this point, at which the rotor (10) emerges from the transmission (1), a sealing ring (not indicated by a specific reference numeral) is provided. In the exemplary embodiment illustrated, the outer bearing (9) is embodied as a collar bearing and can also absorb axial forces. The inner bearing (15) is provided as a floating bearing. Other design embodiments to absorb the axial forces are also possible. The bearings (9, 15) can also be embodied as rolling-contact bearings, for example.

Thanks to the advantageous conical shape of the rotor (10), the diameter of which increases towards the rotor head (11), a high bearing capacity is obtained at the outer bearing (9) through the large bearing diameter. By virtue of the arrangement of the rotor (10), the bearing arrangement (9) can be placed right at the outside, in the transmission cover (8, 8'), resulting in a large span between the rotor bearings (9, 15). This span can be lengthened without any effort in terms of design merely by making the rotor (10) and the housing (3) wider.

Both bearings (9, 15) are embodied as hydrostatic sliding-contact bearings, which can be supplied with oil by a pump (30) and thus have hydrostatic start-up properties. To start up the system, the bearings (9, 15) are raised hydrostatically by operating the electric pump with power from the network connected. As the speed of the rotor (10) increases, the oil pump can be controlled by means of a control and regulating unit (32) and the oil delivery pressure can be deliberately reduced or switched off. This enables the bearings (9, 15) to be supplied selectively on an individual basis with the required quantity of lubricating oil or the required oil pressure. It is thus possible to establish operating conditions in which the oil pressure in the lubricating gap is built up in part hydrodynamically and in part hydrostatically or in a purely hydrodynamic manner.

In the upper half of the FIGURE, the annular gear carrier (7) is produced in one piece with the rotor (10), thereby eliminating another power-transmitting joint. In this embodiment, the housing cover (8) is provided with a separation joint, which runs vertically in the exemplary embodiment illustrated. The parts of the housing cover (8), of which there are preferably two, are bolted together during assembly.

Figure 2:
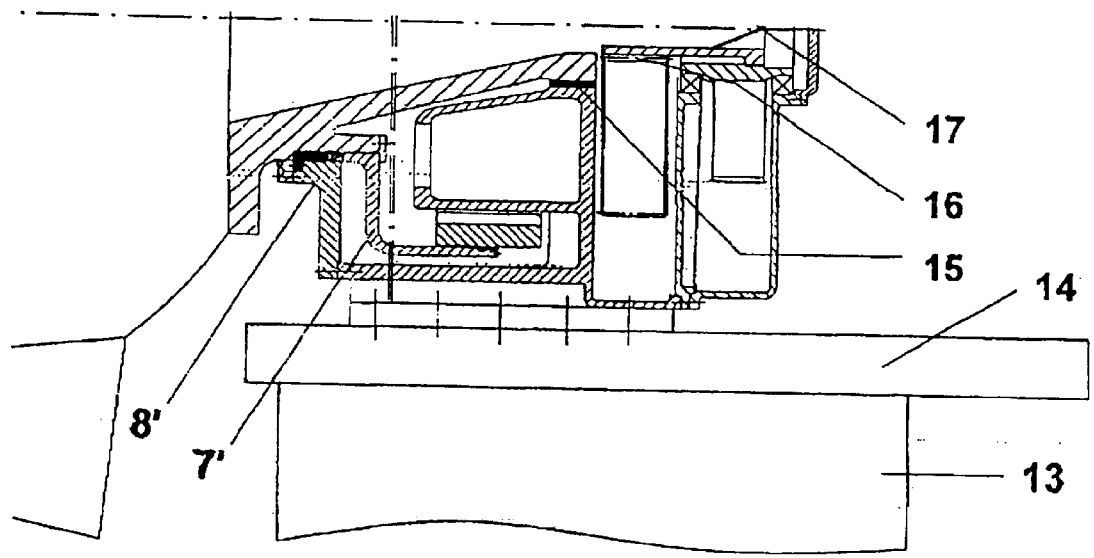
FIG. 2 is a partial section view of a second exemplary embodiment.

Another embodiment is illustrated in FIG. 2. In this variant, the annular gear carrier (7') is mounted as a separate part on the rotor (10). Here, the joint can be made by form locking, e.g. by means of a multi-groove or splined profile, or by force locking, e.g. by means of a press/shrink fit, a shrink fitting disc or a conical seat. Combinations of form- and force-locking, e.g. keys and shrink fitting of the cylindrical shaft/hub surfaces, are also conceivable. Where the annular gear carrier (7') and the rotor (10) are assembled, the housing cover (8') can be of one-piece design.

In both exemplary embodiments (annular gear carrier and rotor in one or more pieces), the annular gear (6) is connected to the annular gear carrier (7, 7') at its outer circumferential surface by means of a crowned toothed coupling (4). This gives the annular gear (6) angular mobility and axial displaceability relative to the annular gear carrier (7, 7'). As a result, the toothing of the annular gear (6) can center itself on the planetary gears (5). This toothed coupling (4) preferably comprises crowned external toothing on the annular gear (6) interacting with straight internal toothing on the annular gear carrier (7, 7').

The planetary transmission stages (6, 5, 2, 16) can be embodied with helical toothing without additional design effort, the axial forces of the planetary gears (5, 2) cancelling each other out, and advantages such as quieter running characteristics and the higher bearing capacity of helical toothing being available. In this case, the axial forces acting on the annular gear (6) must be introduced either into the housing (3) or into the rotor (10).

Fluctuations in the drive, which are due to nonuniform wind conditions or other influences, can be mitigated or compensated for by means of a flexible mounting that allows limited axial mobility of the sun gear shaft (17).

By measuring the axial forces that occur at the sun gear shaft (17), it is furthermore possible to obtain information on the current operating data of the plant, such as the torque, power etc. Given a knowledge of these data, it is then possible to intervene in the operating process by way of control or regulation, e.g. to adjust the angle of incidence of the blades (12) or shut down the system in the event of an overload and a risk that the transmission will be destroyed. For this purpose, a sensor (18), which records the force with which the sun gear shaft (17) mounted in an axially flexible manner on the hub (19) presses on the hub (19), is preferably mounted on the hub (19), which is mounted in an axially fixed manner. A suitable sensor (18) for this purpose is, for example, a load cell (based on a piezoelectric, inductive or similar principle) or a displacement sensor, which records the relative motion of the sun gear shaft (17) and the hub (19) and gives indirect information on the force that arises via the spring constant of the flexible connecting member.

The planetary gear shafts are supported in the planetary carrier—which forms an integral unit with the housing (3)—on both sides of the first planetary gears (5). Mounted on the free end of the shaft there is in each case a second planetary gear (2). Behind the second planetary gear set (2, 16), the housing (3) is closed off by a bearing cover (24)—provided with corresponding apertures—which is centered in a manner secure against twisting in the housing (3). The flanged housing (23) surrounds the spur gear stage (20, 22) and, for its part, is centered in a manner secure against twisting on an encircling shoulder of the bearing cover (24). The ends of the output shaft (21) and of the hub

(19) that face the housing (3) are supported in the bearing cover (24). The respective second bearing arrangements for the output shaft (21) and the hub (19) are inserted into the outer wall of the flanged housing (23). The use of the bearing cover (24) makes it possible to dispense with a horizontal split in the flanged housing (23), which would create a sealing problem.

Depending on the variant embodiment, the transmission (1) can be constructed either as a completely preassembled unit on the platform (14) or be mounted in stages. For reasons connected with maintenance, the sun gear (16) can be pulled out of the transmission (1) together with the sun gear shaft (17) after removal of the central housing cover on the outside of the flanged housing (23).

It is furthermore possible to monitor the operation of the easily accessible bearings of the non-revolving planetary gear shafts, e.g. by means of measurements of structure-borne noise.

The advantageous introduction of power via an annular gear (6) into the first planetary transmission stage (6, 5), which does not require a sun gear—which would limit loading capacity—creates advantageous conditions for the design process, allowing a very compact construction. The resulting outward shift in the load limit and the consequent optimum exploitation of the characteristics of the materials can be further enhanced by case hardening the teeth of the annular gear. This particularly advantageous measure allows the teeth to be made narrower or the diameter of the annular gear (6) to be reduced while transmitting the same power and maintaining the same transmission ratio. This enables the overall volume and weight of the transmission to be further reduced or a higher power to be transmitted with the same transmission if the dimensions of the components are retained.

Other methods of surface hardening can also be used to increase the load limit of the teeth of the annular gear, e.g. induction hardening, flame hardening or combined methods such as carbonitriding or nitrocarburizing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A transmission for a wind generator, the transmission comprising a housing, a rotor supported by said housing and rotatably mounted in said housing, said rotor carrying a rotor head, said rotor being supported in said housing by an outer bearing toward said rotor head and an inner bearing away from said rotor head, said rotor having a larger diameter at said outer bearing than at said inner bearing, a multi-stage planetary transmission stage driven by said rotor, said stage comprising an annular gear fixed to said rotor, at least one planetary gear on a respective at least one shaft which is supported by said housing and rotatably mounted at a fixed position in said housing, said at least one planetary gear meshing with said annular gear, a further planetary gear on each said shaft, and a sun gear mounted on a sun gear shaft, said further planetary gear meshing with said sun gear, and a spur gear stage driven by said sun gear via said sun gear shaft, said spur gear stage being arranged to drive at least one generator.

2. A transmission as in claim 1 further comprising an annular gear carrier fixed directly to said rotor, an annular gear fixed to said annular gear carrier, said multi-stage planetary transmission stage including said annular gear.

3. A transmission as in claim 2 wherein said rotor and said annular gear carrier are formed integrally.

4. A transmission as in claim 2 wherein said annular gear carrier is fitted to said rotor in at least one of a form fit and a press fit.

5. A transmission as in claim 2 wherein said annular gear is fixed to said annular gear carrier by a toothed coupling.

6. A transmission as in claim 2 wherein said annular gear has internal teeth which are surface-hardened.

7. A transmission as in claim 1 further comprising a pair of sliding contact bearings supporting said rotor in said housing, at least one of said bearings absorbing axial forces, an oil pump for raising said bearings hydrostatically, and means for controlling said oil pump so that said bearings can be switched between partially and fully hydrodynamic lubrication.

8. A transmission as in claim 1 wherein said rotor is formed integrally with a rotor head which holds the blades driven by the wind.

9. A transmission as in claim 1 further comprising a bearing housing secured to said housing, and bearings for said spur gear stage supported in said bearing housing.

10. A transmission as in claim 1 wherein said planetary transmission stage comprises gears having helical teeth.

11. A transmission as in claim 1 wherein said planetary transmission stage drives said spur gear stage via a sun gear carried on a sun gear shaft, said sun gear shaft being mounted for resilient axial movement.

12. A transmission as in claim 11 further comprising a sensor which records the axial force of the sun gear shaft.

13. A transmission as in claim 1 further comprising a flanged housing surrounding said spur gear stage, and at least one output shaft arranged in said flanged housing for driving a respective generator, each said output shaft having a pinion gear which engages said spur gear stage.

14. A transmission as in claim 1 wherein said multi-stage planetary transmission stage comprises at least one planetary gear on a shaft which is supported by said housing and rotatably mounted at a fixed position in said housing.

15. A transmission as in claim 1 wherein said rotor carries a rotor head, said rotor having a conical shape with a diameter which increases toward said rotor head.

16. A transmission as in claim 1 wherein said multi-stage planetary transmission stage comprises at least one planetary gear on a respective at least one shaft which is supported by said housing and rotatably mounted at a fixed position in said housing, said planetary gear being located adjacent to said rotor between said outer bearing and said inner bearing.

17. A transmission as in claim 16 further comprising a further planetary gear on each said shaft, and a sun gear on a sun gear shaft, said further planetary gear meshing with said sun gear to drive said spur gear stage via said sun gear shaft.

18. A transmission as in claim 17 wherein said rotor and sun gear shaft are hollow and are coaxially mounted.

19. A transmission for a wind generator, the transmission comprising:

a housing;

a rotor supported by said housing and rotatably mounted in said housing;

a multi-stage planetary transmission stage driven by said rotor, said stage comprising an annular gear fixed to said rotor, at least one planetary gear on a respective at least one shaft which is supported by said housing and rotatably mounted at a fixed position in said housing, said at least one planetary gear meshing with said annular gear, a further planetary gear on each said shaft, and a sun gear mounted on a sun gear shaft, said further planetary gear meshing with said sun gear; and a spur gear stage driven by said sun gear via said sun gear shaft, said spur gear stage being arranged to drive at least one generator.

20. A transmission as in claim 19 herein said spur gear stage comprises a spur gear which is fixed against rotation on said sun gear shaft, said transmission further comprising at least one pinion engaging said spur gear, each said at least one pinion being fixed to an output shaft for driving a generator.

\* \* \* \* \*